United States Patent [19]

Mueller

[11] 4,087,654
[45] May 2, 1978

[54] ECHO CANCELLER FOR TWO-WIRE FULL DUPLEX DATA TRANSMISSION

[75] Inventor: Kurt Huggo Mueller, Holmdel, N.J.

[73] Assignee: Bell Telephone Laboratories, Incorporated, Murray Hill, N.J.

[21] Appl. No.: 636,297

[22] Filed: Nov. 28, 1975

[51] Int. Cl.² .............................................. H04B 3/24
[52] U.S. Cl. .................................................. 179/170.2
[58] Field of Search ............... 179/170.2, 170.6, 170.8; 178/58 R; 333/18

[56] References Cited

U.S. PATENT DOCUMENTS

| Re. 27,250 | 12/1971 | Lucky ..................................... | 333/18 |
|---|---|---|---|
| 3,499,999 | 3/1970 | Sondhi .............................. | 179/170.2 |
| 3,500,000 | 3/1970 | Kelly et al. ........................ | 179/170.2 |
| 3,597,541 | 8/1971 | Proakis et al. ..................... | 179/170.2 |
| 3,732,410 | 5/1973 | Mackechnie ....................... | 179/170.2 |
| 3,922,505 | 11/1975 | Höge ................................... | 179/170.2 |
| 4,007,341 | 2/1977 | Sourgens et al. .................. | 179/170.2 |

OTHER PUBLICATIONS

Koll and Weinstein; "Simultaneous Two-Way Data Transmission Over a Two-Wire Circuit"; I.E.E.E. Transactions on Communications, vol. Com-21, No. 2; Feb. 1973; pp. 143–147.
"Application of Automatic Transversal Filters to the Problem of Echo Suppression"; Bell System Technical Journal; vol. 45, No. 2; Dec. 1966; pp. 1847–1851.
"An Adaptive Echo Canceller"; Bell System Technical Journal; Mar. 1967; vol. 46, No. 3; pp. 497–511.

*Primary Examiner*—Kathleen H. Claffy
*Assistant Examiner*—Randall P. Myers
*Attorney, Agent, or Firm*—Joseph P. Kearns, Jr

[57] ABSTRACT

An adaptive echo canceller for digital data transmission systems permits full duplex, i.e., simultaneous bidirectional transmission, operation at full bandwidth over two-wire transmission facilities. A transversal filter arrangement digitally synthesizes a cancellation signal for unwanted leakage, i.e., echoes, through hybrid junctions directly from the digital data input symbols, rather than from the analog transmitter output. An error control signal for correlation with tap signals on the transversal filter is derived from the output of the receiver, instead of its input.

9 Claims, 3 Drawing Figures

ECHO CANCELLER FOR TWO-WIRE FULL DUPLEX DATA TRANSMISSION

FIELD OF THE INVENTION

This invention relates to the suppression of echo and leakage currents from digital data transmitted and received through hybrid junctions in two-way telephone transmission systems.

BACKGROUND OF THE INVENTION

A data system using full duplex transmission possesses a number of advantages over one restricted to half-duplex operation. Full duplex transmission means simultaneous full bandwidth transmission in both directions over a common medium. Half duplex transmission means alternate full bandwidth transmission in the two directions. With full duplex operation start-up and turn-around delays are avoided, while half duplex operation these delays are inevitable and become very wasteful of transmission time when turnaround delay times are comparable to message block lengths. For interactive data terminal operations full duplex transmission is essential. In the past full duplex transmission was generally based on the use of private line telephone channels with four-wire facilities, i.e., with separate, isolated pairs for each direction of transmission.

For full duplex operation on two-wire facilities, such as are generally available on the public switched telephone network, it has been necessary to split the single available transmission channel into high and low bands dedicated to particular transmission directions. Only half the available bandwidth can then be used for each transmission direction to the detriment of the transmission rate.

Oftentimes it is desirable to be able to employ switched-network two-wire telephone channels as back-up for, or dial-in access to, private line systems.

Many long-haul toll telephone facilities include echo suppressors which are designed to suppress reverse traffic when forward traffic has seized the facility even though long-haul facilities are generally four-wire arrangements. Whenever the direction of traffic is to be reversed, one set of echo suppressors must be disabled and another set activated. Thus, simultaneous two-way traffic is precluded without special arrangements for disabling all echo suppressors, but such arrangements are routinely included in many full-duplex voice grade modems.

For simultaneous two-way transmission within the same frequency band it is mandatory to separate the local transmitter signal from the usually weak signal received from the remote site. Hybrid networks or bridge circuits, realizable with or without transformers, are standard and well-known arrangements for achieving this separation. In such circuits, a terminating impedance equal to the impedance of the two-wire line must be used for perfect separation. Due to the complex and frequency dependent nature of this impedance, only a very approximate compensation is possible in practice. Direct leakage across the hybrid and delayed echoes caused by signals reflected on more distant line impedance mismatches will thus cause transmitter signal components to interfere with the received distant signal. The effect of delayed echoes is particularly annoying in communication over satellite channels.

Adaptive echo cancellers implemented by transversal filters have been proposed for analog facilities by, for example, J. L. Kelly, Jr., and B. F. Logan, Jr. in U.S. Pat. No. 3,500,000 issued Mar. 10, 1970. In the latter echo canceller a portion of the analog signal incoming to a hybrid junction on the four-wire side is passed through a transversal filter with adjustable tap gain controls to synthesize a cancellation signal for subtraction from the signal outgoing from the hybrid junction. The resultant outgoing signal is clipped and correlated with the sequence of samples of the incoming signal appearing at the taps of the transversal filter to form control signals for the tap gains or weighting coefficients of the transversal filter.

A similar arrangement is described by F. K. Becker and H. R. Rudin in the *Bell System Technical Journal* [Vol. 45, 1966, pp. 1847–1850], in a paper called "Application of Automatic Transversal Filters to the Problem of Echo Suppression". Results are achieved with a practical realization are reported by V. G. Koll and S. B. Weinstein in the *IEEE Transactions on Communications,* [Vol. COM-21, No. 2, 1973, pp. 143–147] in a paper entitled "Simultaneous Two-Way Data Transmission Over a Two-Wire Circuit." The transversal filter as applied to automatic and adaptive equalization of digital data signals has been disclosed in R. W. Lucky U.S. Pat. No. Re–27,250 as comprising a delay line having a plurality of taps equally spaced at T-second intervals corresponding to the reciprocal 1/T of the synchronous data symbol rate.

In order to implement such an echo canceller for analog voice signals large numbers of taps are required on the transversal filter spaced by the reciprocal of twice the highest frequency to be expected in the echo or leakage signal and spread over the maximum echo delay. For voice channel bandwidths the number of taps required is then on the order of eight for each millisecond of round-trip echo delay. Furthermore, two multiplications are needed for each tap, one for correlation purposes and tap gain adjustments, and another for computation of the transversal filter output signal. Even with digital techniques using analog-to-digital and digital-to-analog conversion, the circuit complexity of this approach becomes prohibitive if distant echos have to be cancelled.

It is an object of this invention to provide simultaneous full duplex digital data transmission over two-wire communications facilities with full bandwidth utilization for each transmission direction.

It is another object of this invention to adapt the transversal filter to echo and leakage cancellation in two-way data transmission systems to permit full bandwidth, full duplex operation.

It is a further object of this invention to reduce the cost and complexity of echo and leakage cancellers for data transmission systems.

SUMMARY OF THE INVENTION

In accordance with this invention the data-like nature of the echoes or leakage components from transmitter to receiver through the four-wire to two-wire junction in a two-way data terminal is utilized to derive a cancellation or compensation signal directly from the data symbols. The echo canceller for data modems which include a bridging connection to a two-wire transmission channel comprises a processor taking baseband data symbols directly from the data source (with or without randomizing) before modulation, shaping, or filtering; an error control circuit for the processor which takes an input from the receiver after the incoming analog signal has been converted into baseband data symbols; and a summing circuit for combining the output of the processor with the incoming received signal. The processor preferably comprises a linear sequential transversal filter with taps spaced at the data symbol transmission interval, an adjustable gain device at each tap, a correlator at each tap for a common error signal and the data symbol thereat, and a summer for tap signals selectively weighted by the gain devices. The error control signal is derived by comparing the actual and quantized outputs of the data receiver. The correlation of the error signal with the respective tap signals results in a mean square minimization of the residual echo or leakage component. Effectively the mean-square error difference between each tap output and its contribution to the overall error output is forced toward zero. The disclosed echo canceller can be looked at as an adaptive transmitter, with identical inputs of and in parallel with, the main transmitter.

Since the data symbols applied to the processor are either one bit symbols in the case of a binary system, or two or three bit symbols at most in the case of a multilevel system, the following features result: the required serial memory size (number of taps) of the transversal filter is substantially reduced, and the required multiplying operations for both output computation and tap gain adjustments are simplified. In the case of two level signaling, the multiplier circuit can be replaced by a simple adder, since the tap signals are only ±1. Cancellation itself can be done in passband or baseband, in digital or analog form, and either on a continuous basis or at sampling instants only.

BRIEF DESCRIPTION OF THE DRAWING

The objects, advantages and features of this invention will become more apparent from a consideration of the following detailed description and the drawing in which.

DESCRIPTION OF THE ILLUSTRATIVE EMBODIMENTS

The echo canceller disclosed by Kelly et al. in their cited patent application was intended principally to cancel echoes arising in a point-to-point analog transmission link in which the terminals were connected by long-haul four-wire facilities over which very long delays were experienced. The echo canceller operated on the signal on the incoming four-wire leg as it entered the hybrid junction and applied the correction signal to the outgoing four-wire leg as it left the hybrid junction. Effectively the echo canceller was in parallel with the hybrid junction on the four-wire side and both its input and output were analog in form.

Figure 1:
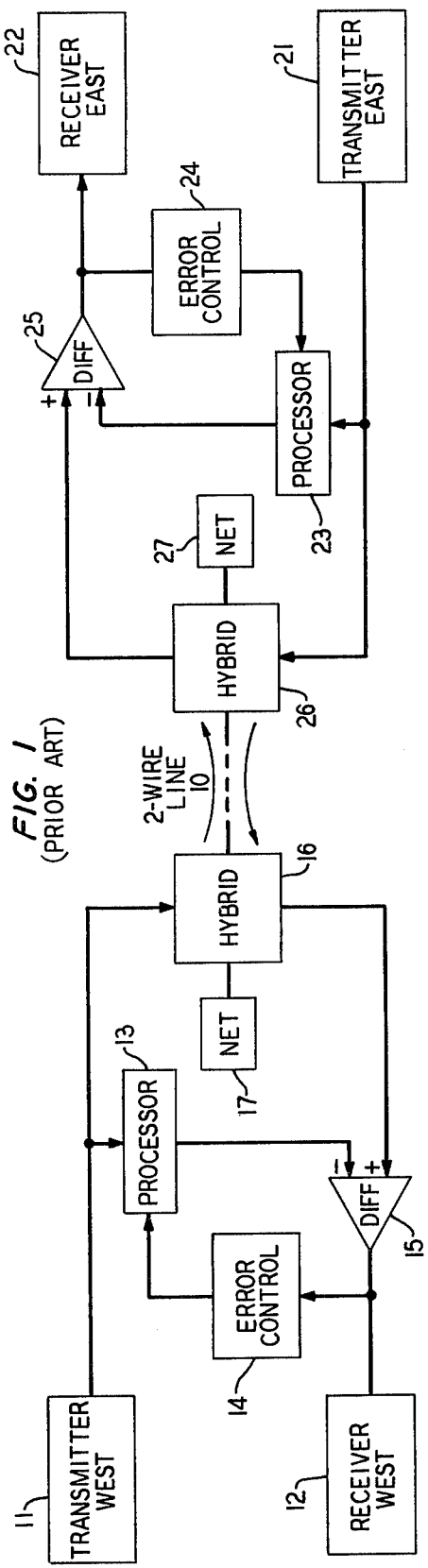
FIG. 1 is a block diagram of an adaptive echo or leakage canceller for a two-way telephone transmission system according to principles known to the prior art.

FIG. 1 shows the structure of an echo or leakage canceller for a digital data transmission system designed in accordance with the principles of Kelly et al. The data transmission system depicted comprises a west terminal to the left of two-wire line 10, an east terminal to the right of two-wire line 10 and two-wire line 10. The west terminal comprises a transmitter 11, receiver 12, a processor 13, error control 14, difference amplifier 15, hybrid junction 16 and balancing network 17. Similarly, the east terminal comprises transmitter 21, receiver 22, processor 23, error control 24, difference amplifier 25, hybrid junction 26 and balancing network 27. The east and west terminals are mirror images of each other with respect to two-wire line 10.

An intelligence signal from transmitter west 11, whether in baseband or passband form is applied to one input of hybrid junction 16 and also is tapped off to processor 13. At the same time an incoming signal on two-wire line 10 incident at hybrid junction 16 is intended to be delivered to receiver west 12 without contamination by any outgoing signal originating in transmitter west 11. If hybrid 16 were perfectly balanced by network 17, there would be no such contamination. However, network 17 is fixed in value and can provide the ideal termination for only one line condition. The latter, however, is dynamic and time varying. Accordingly, a certain unavoidable portion of the outgoing signal from transmitter west 11 leaks across hybrid junction 16 and joins as an echo with the received signal. The received signal component, further corrupted by noise, is normally applied directly to receiver west 12. However, as part of the echo canceller, difference circuit 15 is interposed between hybrid junction 16 and receiver west 12. Difference circuit 15 is also supplied with the output of processor 13, which ideally generates a compensation signal exactly matching the leakage signal across hybrid junction 16.

The above description applied in a straightforward manner to the east terminal.

Figure 2:
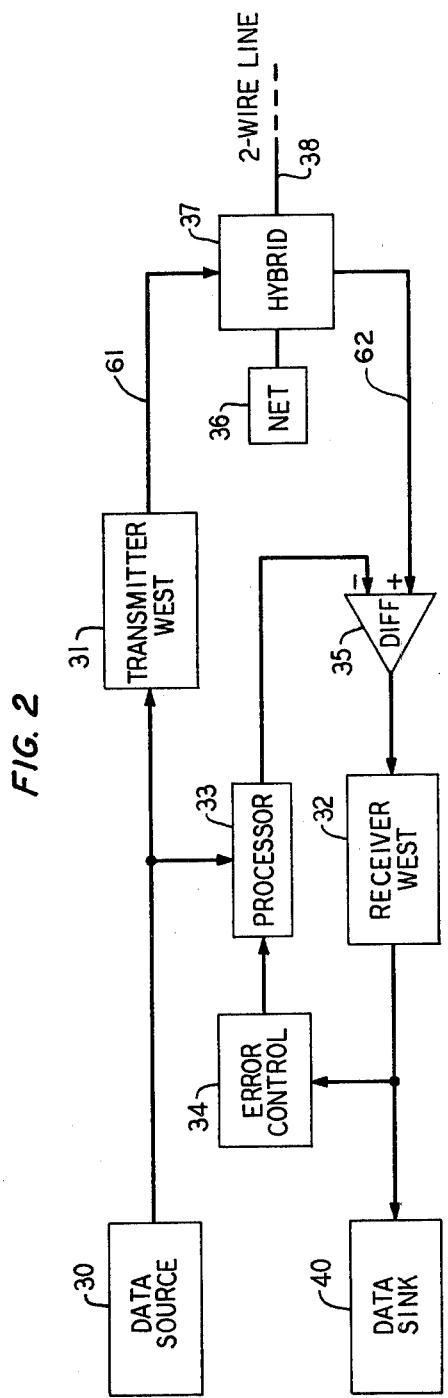
FIG. 2 is a block diagram of an improved adaptive echo or leakage canceller for a terminal of a digital data transmission system according to this invention.

FIG. 2 illustrates in block diagram form the improved echo canceller for digital data transmission systems. Only the west terminal is shown, since the east terminal is a mirror image of the former. FIG. 2 differs from FIG. 1 in explicitly depicting data source 30 and data sink 40, whereas FIG. 1 was implemented for analog signals appearing at the input and output of the hybrid junction. FIG. 2 comprises a processor 33 and error control 34 directly responsive to the respective output of data source 30 and input of data sink 40 on the customer side of transmitter 31 and receiver 32, instead of on the hybrid junction side as in FIG. 1. Difference circuit 35 is in the same relative position with respect to hybrid junction 37 and receiver 32 as their counterparts in FIG. 1; but it is to be understood that echo compensation could also take place after some of the receiver functions have already been accomplished; e.g., in a passband system error control 34 and processor 33 may be designed for compensation in the baseband, after demodulation of the contaminated received signal.

Moving the echo canceller to the input side of the transmitter and output side of the receiver permits the computation rate of processor 33 to be scaled down to the data symbol rate for echo compensation at sampling instants only, rather than to twice the rate of the highest frequency component as required in the prior art.

Figure 3:
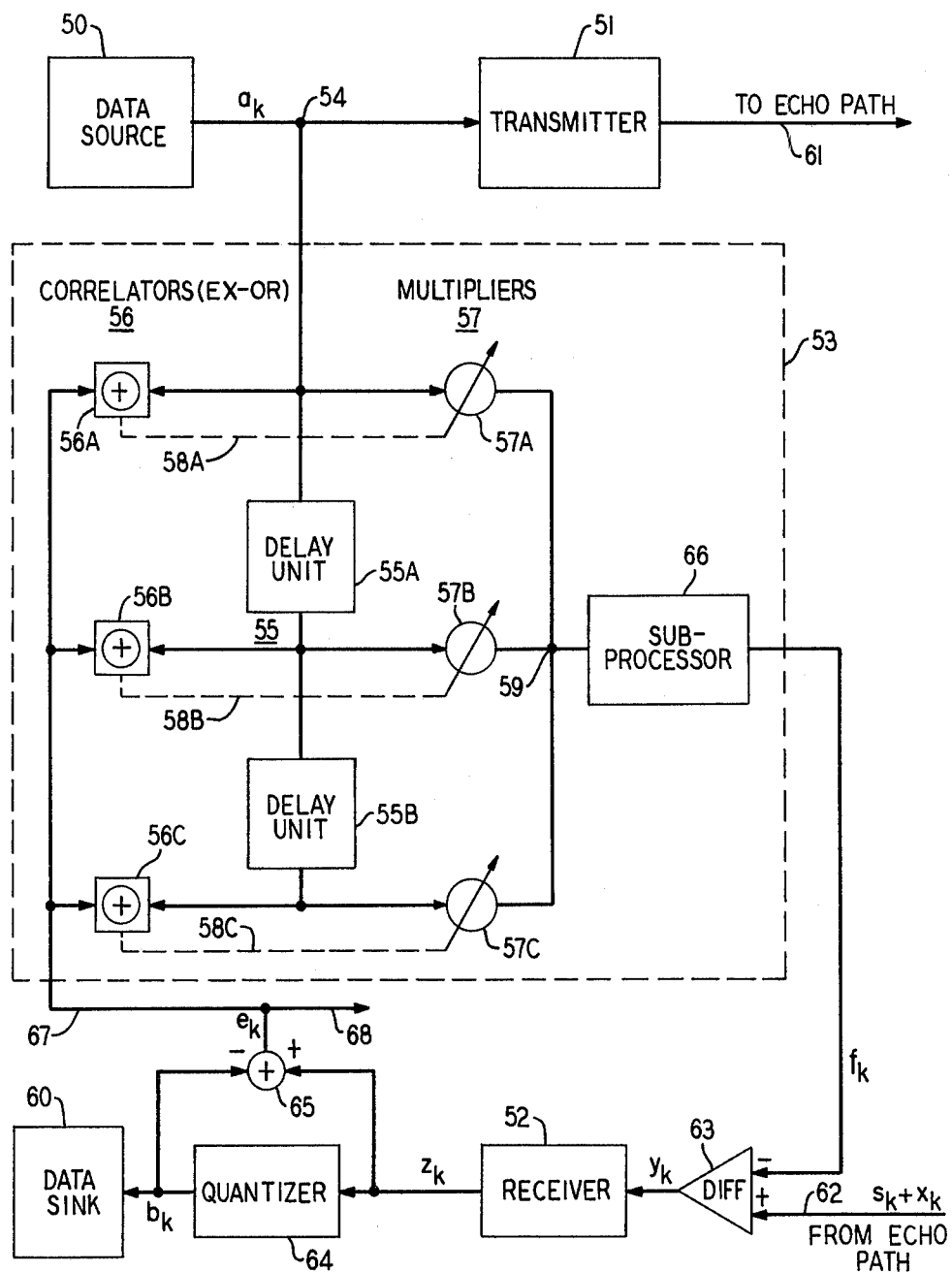
FIG. 3 is a more detailed block diagram of an adaptive echo or leakage canceller for a terminal of a digital data transmission system employing a transversal filter according to this invention.

FIG. 3 is a more detailed block diagram of the echo canceller for data transmission systems according to this invention which employs a transversal filter. Again only the west terminal is shown, the east terminal being understood to be the same.

Data source 50 provides a synchronous succession of data symbols $a_k$ at T-second intervals (where T is the fixed interval between data symbols and $k$ is as integer indexing such symbol intervals), restricted to discrete values, to transmitter 51 which spectrally shapes the symbols and applies them to the transmission channel by way of echo path 61. The symbols $a_k$ are also provided at junction 54 to echo cancellation processor 53 (broken line box). Return signals from echo path 62, including a leakage component $s_k$ and the desired signal $x_k$, are applied to one input (+) of difference circuit 63, which has a compensation, or echo-cancelling, signal $f_k$ applied to another input (−). Desired signal $x_k$ contains data symbols $b_k$ transmitted from the east terminal. The corrected signal $y_k$ is processed as necessary in receiver 52 to output signal $z_k$ and detected by quantizer 64 to furnish data symbols $b_k$ to data sink 60. An error signal $e_k$ is developed from the difference taken in subtractor 65 between the continuous input and discrete output of quantizer 64.

Within processor block 53 is a transversal filter of the type and structure described in the cited Lucky patent comprising delay units 55 (two such designated 55A and 55B are shown explicitly in FIG. 3), correlator 56 (shown explicitly as 56A through 56C connected respectively at the input of delay unit 55A, the junction tap between delay units 55A and 55B and at the output of delay unit 55B), and multipliers 57 (shown explicitly as 57A through 57C connected to the same points on delay units 55 as correlators 56), and sub-processor 66. Correlators 56 at each tap are coupled to multipliers 57 thereat by electrical or mchanical means 58 (indicated by dashed lines) so that the output of a correlator 56 increments of multiplier 57 in the appropriate direction. Delay units 55 can advantageously be binary shift registers storing a sequence of data samples $a_k$. Although only a single input, an intermediate and an output tap are shown explicitly in FIG. 3, it is to be understood that a larger number will generally be required in a practical embodiment. Multipliers 57 can be considered to have gain coefficients $c_k$ which are incremented according to the outputs of correlators 56 in the appropriate direction as mentioned above. Correlators 56 are multipliers (exclusive OR gates in the most simple version) with one input connected in common to an error control signal on lead 67 from subtractor 65. Substractor 65 is substantially the same as that shown and described in the cited Lucky patent as element 32 and can be implemented in an obvious manner by an operational amplifier. The other input of each correlator is connected to a tap or junction associated with each delay unit 55. The summation of the products of the data samples and the tap-gain coefficients appears at junction 59 to form a correction signal that is applied to sub-processor 66. Sub-processor 66 may be a straight wire in the case of a Nyquist system where compensation is only required at the sampling instants and where timing at both locations is synchronized. It may be a smoothing filter when continuous compensation is required. It may be an up-modulator in the case of a passband system. The output of sub-processor block 66 forms an echo cancellation signal $f_k$ for application to a difference circuit 63.

Difference circuit 63 combines the incoming echo path signal ($s_k + x_k$) on lead 62 with the echo cancellation signal $f_k$ from processor 53 to form received signal $y_k = x_k + s_k - f_k$. Echo cancellation will occur when the compensation signal $f_k$ synthesized in processor 53 is equal to echo signal $s_k$. The incoming signal on lead 62 includes the desired far-end digital signal $x_k$ including data elements $b_k$ as operated on by the transmission channel impulse response $h(t)$; the undesired near-end signal $s_k$ reflected across the hybrid junction including outgoing data elements $a_k$ as effected by the echo response across the hybrid junction; and noise $n_k$.

The cancellation signal $f_k$ is the summation of the products of the outgoing data elements $a_k$ and the tap-gain multiplying factors $c_k$. The difference signal $y_k$ in the output of difference circuit 63 is filtered (and demodulated in the case of a passband system) in receiver 5 to form an output signal $z_k$. The latter signal is detected or quantized in quantizer 64 to estimate desired far end received symbols $b_k$. The error difference between the continuous output $z_k$ of receiver 52 and the quantized output $b_k$ is an error signal $e_k$ on leads 67 and 68. The error signal $e_k$ appearing on lead 67 is correlated with tap samples $a_k$ as previously mentioned. The error signal $e_k$ on lead 68 is available for control of a transversal equalizer which may be employed in receiver 52 to minimize intersymbol interference in the desired component of the incoming signal $x_k$.

It can be shown that the correlation of the outgoing tap samples $a_k$ with the error signals $e_k$ is proportional to the gradient of the mean square echo error with respect to the tap-gain weighting coefficients. To remove the constraints of long time averaging as required for exact correlation, the tap weighting coefficients are incremented at each sampling instant or periodically by a constant step size times the product of error and tap signal (estimated gradients). Thus, the algorithm for adjusting tap-gain coefficients can be expressed mathematically as:

$$c_{n+1} = c_n + g\, a_n e_n, \quad (1)$$

where $c_{n+1}$ = updated vector of tap-gain coefficients
 $c_n$ = present vector of tap-gain coefficients
 $g$ = step size
 $a_n$ = present vector of tap samples
 $e_n$ = present error value.

In an even simpler implementation, the coefficient increments are fixed in magnitude, and their polarity is determined by the product of the polarities of error signal and tap sample (exclusive-OR correlator).

Equation (1) is an adaptive algorithm coverging to a set of tap gain coefficients that will yield optimum echo compensation. The value $g$ is selected with due regard to the channel noise, degree of intersymbol interference and number of taps on the delay medium. The number of taps in turn is to be determined by the duration of the echo period.

While this invention has been described in terms of a specific illustrative embodiment, it is to be understood that it is susceptible of modification by those skilled in the art to which it relates within the spirit and scope of the appended claims.

What is claimed is:

1. An echo canceller for digital data transmission systems including terminals having both a transmitter section and a receiver section for simultaneous two-way signaling at full bandwidth over a common two-wire signal path comprising at each terminal an adjustable signal processor for synthesizing an echo-cancellation signal having its input connected to a data symbol source preceding the transmitter section for an outgoing signal toward said two-wire signal path and its echo-cancelling output signal connected in subtractive relationship with the incoming signal over said two-wire signal path from a remote terminal to form a substantially echo-free signal for said receiver section and means responsive to the error difference between quantized and actual outputs of the receiver section for generating a control signal causing said echo-cancellation signal from said signal processor to minimize said error difference.

2. The echo canceller defined in claim 1 in which said adjustable signal processor comprises a synchronously tapped delay medium, an adjustable gain device for each tap on said delay medium, correlator means for each tap jointly responsive to the control signal from said generating means and to the data samples at each delay-medium tap for updating said adjustable gain devices, and means for combining tap signals operated on by said adjustable gain devices.

3. The echo canceller defined in claim 1 in which said adjustable signal processor comprises a serial memory providing access to input, output and intermediate taps, an exclusive-OR gate assigned to each tap on said serial memory for correlating the data samples on said serial memory with said control signal, an adjustable gain device for each tap of said serial memory, and means for updating said gain devices under the control of said exclusive-OR gates.

4. The echo canceller defined in claim 1 in which said transmission system operates at passband between terminals and the output of said signal processor is up modulated to such passband before being subtracted from the incoming signal from a remote terminal.

5. In a two-way data transmission system having four-wire to two-wire bridges between a common transmission link and terminals including separate transmitter and receiver sections, a compensation circuit for transmitter signal components leaking across said bridge between transmitter and receiver sections at each terminal for said data transmission system comprising means jointly responsive to data signals applied to the transmitter section and an error difference in recovered data signals from the receiver section for generating a compensation signal, means for subtracting the compensation signal from said generating means from data-containing signals incoming from said transmission link to said receiver section, and means responsive to an error difference between quantized and actual outputs of said receiver section for adaptively adjusting said generating means to minimize said error difference.

6. The data transmission system set forth in claim 5 in which said generating means comprises a plural tapped transversal filter.

7. The data transmission system set forth in claim 5 in which the error difference between quantized and actual outputs of said receiver section are correlated with a plurality of consecutive data signals applied to said transmitter section and said plurality of consecutive data signals applied to said transmitter section are selectively weighted in accordance with accumulated error correlations and combined to form said compensation signal.

8. The data transmission system set forth in claim 5 in which said generating means comprises a transversal filter having a plurality of signal taps spaced by the synchronous data signaling interval.

9. The data transmission system set forth in claim 5 in which said generating means comprises a serial memory having signal taps at input, output and between-stage positions, an exclusive-OR gate for correlating the polarity of the error differences between quantized and actual outputs of said receiver section with data signal samples at each tap on said serial memory, an adjustable multiplier for selectively weighting data signal samples at each tap on said serial memory in accordance with accumulated outputs of said exclusive-OR gates, and a signal combiner for all the selectively weighted outputs of said multipliers for forming said compensation signal.

* * * * *